Figure 1:
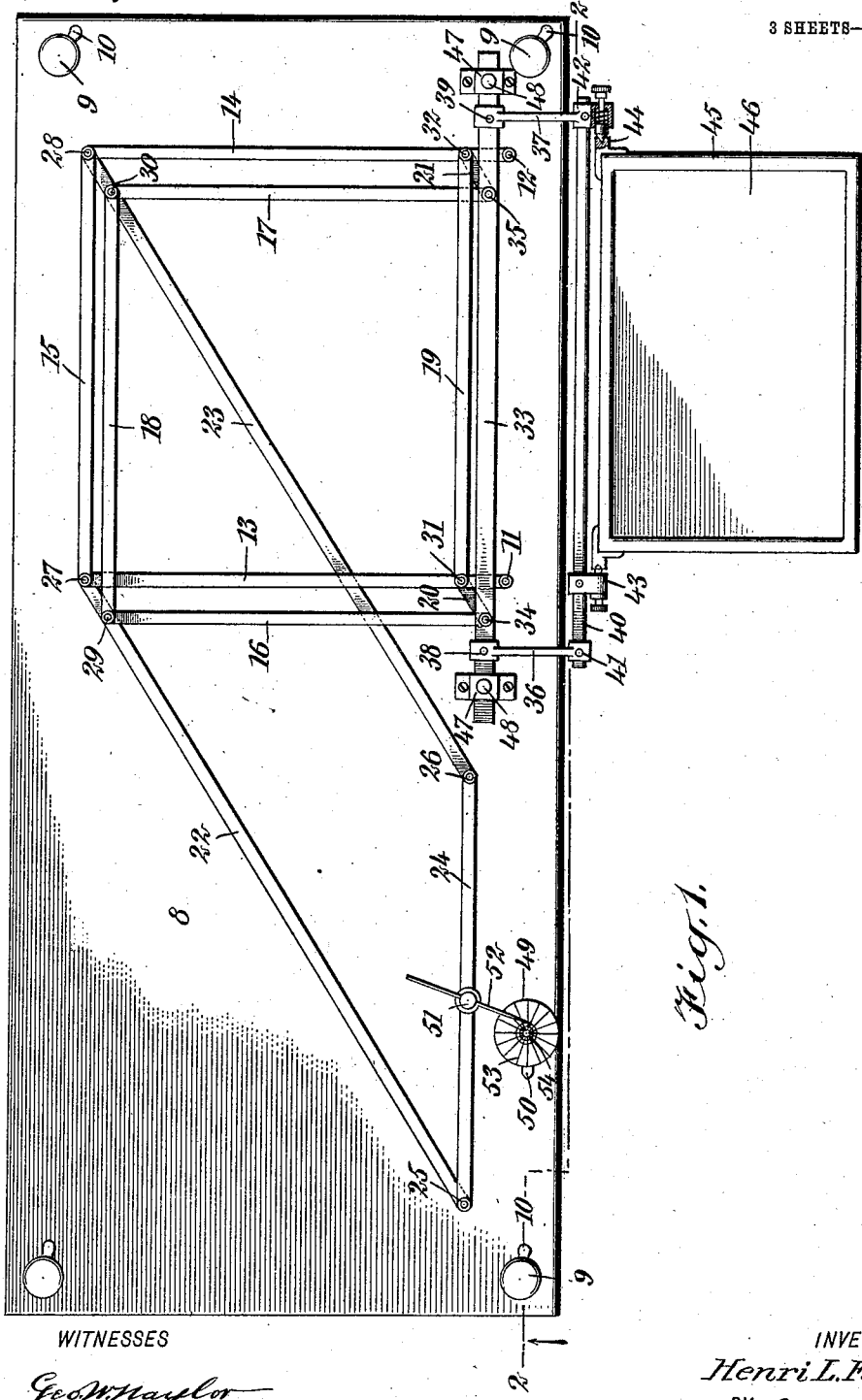

H. L. FALCO.
PANTOGRAPHIC SHIFTER.
APPLICATION FILED MAY 26, 1908.

906,209.

Patented Dec. 8, 1908.

3 SHEETS—SHEET 1.

WITNESSES

INVENTOR
Henri L. Falco
BY
ATTORNEYS

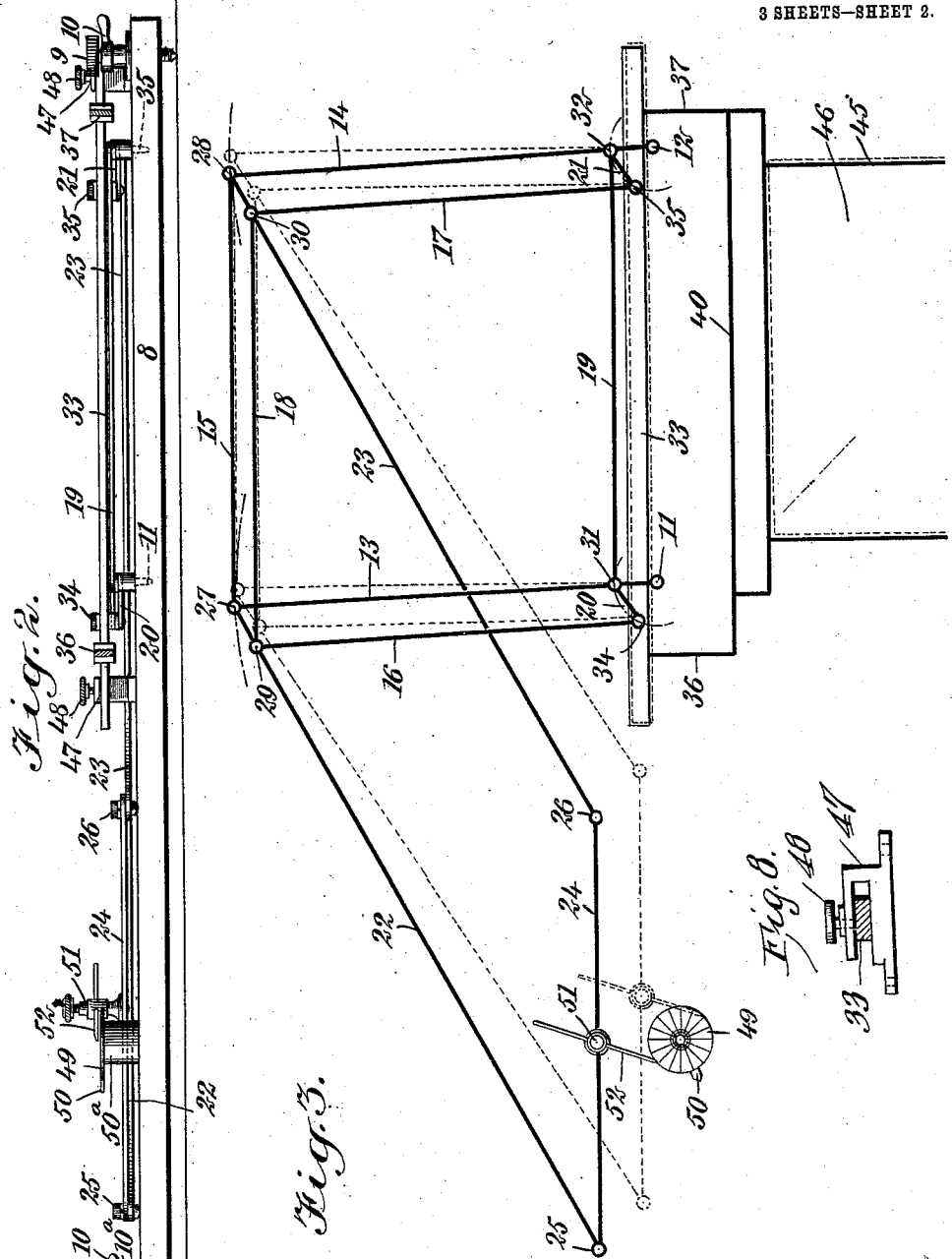

H. L. FALCO.
PANTOGRAPHIC SHIFTER.
APPLICATION FILED MAY 26, 1908.
906,209.
Patented Dec. 8, 1908.
3 SHEETS—SHEET 3.
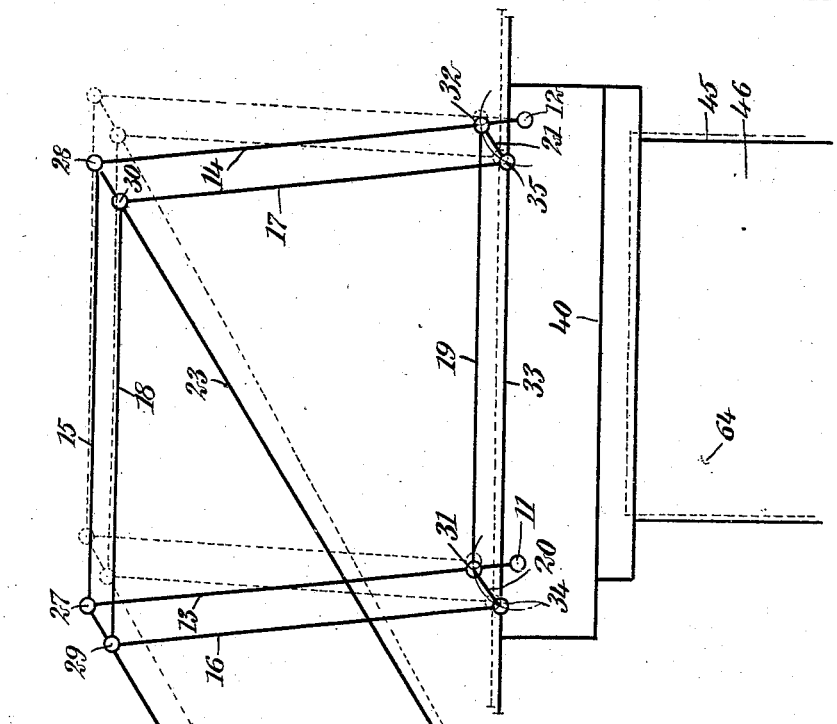
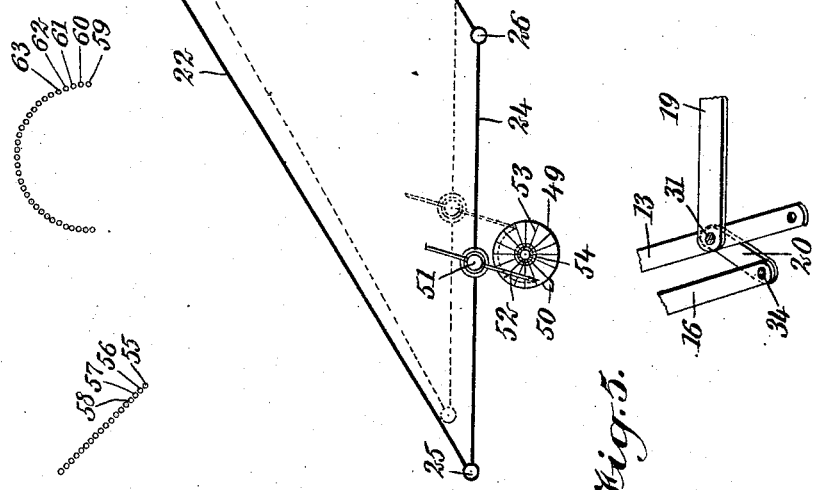
WITNESSES
INVENTOR
Henri L. Falco
BY
ATTORNEYS

UNITED STATES PATENT OFFICE.

HENRI L. FALCO, OF NEW YORK, N. Y.

PANTOGRAPHIC SHIFTER.

No. 906,209.　　　Specification of Letters Patent.　　　Patented Dec. 8, 1908.

Application filed May 26, 1908. Serial No. 435,086.

*To all whom it may concern:*

Be it known that I, HENRI L. FALCO, a citizen of the United States, and a resident of the city of New York, borough of Brooklyn, in the county of Kings and State of New York, have invented a new and Improved Pantographic Shifter, of which the following is a full, clear, and exact description.

My invention relates to printing and arts allied thereto, my more particular purpose being to provide means for readily shifting a printing film or the like, as hereinafter described, for the purpose of multiplying the design carried by the film.

It will be understood that in the use of printing films, a single film having an appropriate design may frequently be made the basis for a large number of composite designs, the latter being formed by shifting the printing film into different positions and making an impression with the film in each position. For instance, the printing film may be provided with plain circular stipples of small diameter, and if only one impression be taken from the film, it will, of course, show the stipples as they appear upon the printing film but in reverse order. If, now, the printing film be moved slightly in relation to the surface upon which the impression has just been taken, and a second impression be taken, the result will be a composite design differing in appearance from a simple design made by a single impression of the same film. If, now, the film be moved again in a direction independent of the direction in which it moved to take the second impression, and a third impression be taken upon the surface which had received the first two, the result will be a new design differing still further from that made by a single impression. By following the idea, very elaborate designs can be built up from printing films provided with very simple impression characters, the number and variety of the composite films being limited only by the skill of the operator, though, of course, any design, however composite, if made from a single film, must retain some of the characteristics of that particular film. For instance, if a film be provided with circular stipples all of the same diameter, the curvature of these stipples must, to some extent, manifest itself in any design, however composite, which may be made up from impressions of this film. By taking a number of successive impressions, however, so gaged that a particular stipple will overlap the impression already made by the same stipple, it is possible to produce composite figures differing from the stipple in that they are elongated, and by skilfully changing the direction of movement of the film after each impression, or after a predetermined number of impressions, it is possible to produce designs so different from that made by a single impression as to almost exclude the individuality of the original design.

While printing film frames as heretofore used and operated have been for a long time employed for producing composite designs as above described, the difficulty of moving the film over precise and exact distances of small magnitude has been very great. A still greater difficulty has been experienced in facilitating the movement of the film in arbitrary directions suggested by the lines of a predetermined design. If the printing film frame contained only a single stipple, it might be a comparatively easy matter to move the printing frame by hand so as to bring the stipple successively into a sufficient number of different positions to produce almost any composite design. The printing film, however, contains more than one stipple. Usually the stipples are distributed practically all over it. The design to be followed, therefore, means practically the itinerary to be followed not by a single stipple, but by each stipple upon the printing film. To give each and every stipple practically the same movement in any and every direction chosen by the operator is the main purpose of my invention.

Stated in a different way, my invention comprises means for so shifting a printing film frame (containing a transparent printing film) as to enable the film to be laid flat down in a number of successive positions for the purpose of making a number of separate impressions from the film as the latter is thus moved in a step-by-step manner, each stipple or equivalent character upon it following a general path of travel dictated by a particular preconceived design and being controllable by the operator.

In connection with printing films and printing film frames as heretofore used it has not been difficult to move the printing film in certain particular directions, but it has been impracticable to move it in other directions without interfering with its accuracy and moreover requiring considerable time for the execution of such movement. That is to say, it has heretofore been practicable to move a printing film frame, say to the right or to the left, or toward the center of a table or from the center of such table, the film carried by the frame thus having practically only four directions of movement. Since, however, a design, and especially a design having curved lines, may require that the film be moved in an indefinite number of directions, and that these movements have no linear relation to each other, it follows that some means should be provided whereby the printing film frame (and consequently the printing film carried by it) may be moved at liberty in absolutely any direction chosen by the operator, but occupying a definite plane representing, say a flat surface of paper. My invention accomplishes this purpose. What I seek to do is to place the printing film so thoroughly under the operator's control, that he can shift the film in any horizontal direction and to any reasonable distance desired, and yet maintain the film in its mountings so accurately adjusted in all other respects as to interfere not at all with its successful execution when employed continuously in its capacity as a printing surface.

I take an ordinary printing film frame provided with a film, mount the frame upon hinges of the usual or any desired pattern, and secure these hinges upon an appropriate support. I then connect with this support a number of levers so arranged as to constitute a pantographic movement. When a certain portion of this frame is moved by hand in any chosen direction, the printing film frame is moved in the same direction, but in lesser degree. The result is that the printing film is brought into a number of successive positions, the general path of travel of the film, or rather of any particular point upon it, being similar in every sense to the path of travel made by the above-mentioned portion of the frame, but upon a reduced scale.

I further use in connection with a portion of the frame referred to, an indicating mechanism for disclosing to the operator at all times the relative position of the part he is moving in order to shift the printing film frame. By aid of this indicator the operator can, by shifting the aforesaid movable portion of the pantographic frame successively into different positions, cause the printing film to follow similar paths but upon a smaller scale.

I further provide means whereby the operator may, after moving the printing film frame to a predetermined position, lock the movable parts so that the film can not be misplaced. This may occur, for instance, where the operator desires to take a number of separate impressions without further moving the printing film frame.

It will be undestood that the above described movements of the printing film frame do not interfere with the taking of impressions from time to time by aid of the film. Usually after each movement of the kind above described, the printing film frame is swung upwardly upon its hinges, the printing film is inked upon its under side by aid of an ink roller, the printing film frame is swung downwardly after being inked, and the printing film is pressed flat against the surface upon which the impressions are being made.

It will be further understood that the printing films used are transparent, in order that the operator looking at the back of the film, may see not only the work made by former impressions upon the paper below, but can also see where a particular stipple, or analogous character, is about to print upon the paper as soon as pressure is applied to the back film.

The prominent feature of my invention is the provision of appropriate mechanism working in this particular representative instance somewhat upon the principle of a double-acting pantograph having a movable member under direct control of the operator, the printing film frame being movable by the mechanical action of the pantograph. As the pantograph employed is made up principally of bars pivoted together, some of these bars acting as levers, the mechanism shown might be designated as a system of levers for moving the printing film frame and mechanism for guiding the operator as he actuates the system of levers by hand.

Reference is to be had to the accompanying drawings forming a part of this specification, in which similar characters of reference indicate corresponding parts in all the figures.

Figure 1 is a plan view showing the pantographic mechanism controllable by hand, the printing film connected with the pantographic mechanism and movable thereby, and a circular scale having both radial and annular graduations and serving as a guide for the use of the operator as he actuates the pantograph; Fig. 2 is a vertical section upon the line 2—2 of Fig. 1, looking in the direction of the arrow, and showing the manner in which the various bars are pivoted together, and also showing how the table is supported; Fig. 3 is a diagrammatic plan otherwise similar to Fig. 1 and showing by dotted and full lines how a movement of the guiding needle and parts of the pantograph connected therewith cause a similar movement, but upon a smaller scale, of the entire printing film frame; Fig. 4 is a diagrammatic plan made somewhat after the order of Fig. 1, and indicating by dotted and full lines a movement of the operative portions of the pantographic mechanism and a corresponding movement of the printing film frame; Fig. 5 is a detail showing how some of the bars of the pantographic frame are connected with each other and with the table; Fig. 6 is a fragmentary plan showing how a stipple may be repeated so as to produce in the aggregate a straight line made up of stipples, this being, for instance, a composite design to be made and multiplied by the action of the printing film; and Fig. 7 is a view similar to Fig. 6 but showing another composite design built up by the action of the printing film by repeating the impression of a single stipple, and meanwhile moving the printing film frame step by step in a general path of travel represented by a semicircle. Fig. 8 is a detail showing how one of the bars connected with the pantograph and movable thereby may be temporarily clamped in position for the purpose of preventing undesirable movements of the printing film frame.

A table 8 is provided at its corners with supporting screws 9 so arranged that by turning these screws the height of the table may be adjusted. Nut locks 10 are employed for securing the screws rigidly in position when once adjusted. Fixed nuts 10$^a$ encircle the screws 9 and are secured upon the table, the screws working through these nuts as will be understood from the left of Fig. 2.

Journaled upon the table 8 by aid of pivot pins 11, 12 are bars 13, 14 connected together at their outer ends by a bar 15. Two other bars 16, 17 are similarly connected at their outer ends by a bar 18. A bar 19 connects together the bars 13, 14 at points adjacent to the ends thereof opposite the bar 15. Links 20, 21 extend from the bars 16, 17 to the bars 13, 14. Bars 22, 23 are connected together by a bar 24 by aid of pivot pins 25, 26. Similarly pivot pins 27, 28, 29, 30, 31, 32 connect together the other bars above mentioned. A bar 33 is connected by pivot pins 34, 35 with the bars 16, 17.

Brackets 36, 37 are mounted upon the bar 33 by aid of set collars 38, 39. A supporting bar 40 is secured to the brackets 36, 37 by aid of set collars 41, 42 carried by these brackets. Journaled upon the supporting bar 40 by aid of hinges 43, 44 is a printing film frame 45; this is an open frame of rectangular form and stretched across it is a transparent printing film 46. The printing film frame 45, the hinges 43 and the supporting bar 40 may be of the usual or any preferred construction. The printing film frame, being mounted upon hinges, may be raised upon its edge for the purpose of inking the film upon its under side and lowering it into engagement with any surface which is to receive an impression from it.

Mounted rigidly upon the table 8 are brackets 47 provided with screws 48 for the purpose of clamping the bar 33 rigidly in predetermined positions whenever desired after such positions have been ascertained by the operator. This feature is of peculiar value in instances where it may be desirable after moving the printing film to a new position, to take a number of successive impressions.

A disk 49 is provided with a pointer 50 serving as a handle. The disk is revolubly mounted upon a lug 50$^a$, the latter being secured rigidly upon the table. A screw 51 is mounted upon the rod 24 and has the general form of a binding post. Extending through this screw is a needle 52 the point of which is adapted to be moved over the disk 49. This disk is provided with radially extending graduations 53 and with annular concentric graduations 54. The operator can turn the disk 49 into an indefinite number of relative positions. Then, by moving the point of the needle 52 relatively to the disk, using as a guide the graduations 53, 54, the operator can actuate the pantographic mechanism so as to move the printing film 45.

By taking continued impressions one after each successive movement of the printing film frame 45, the operator may produce composite designs as above described and exemplified, for instance, in Figs. 6 and 7. Suppose he wishes to reproduce and multiply the design shown in Fig. 6. For this purpose he selects a particular printing film having a plain stippled surface with dots spaced equidistant, a so-called "machine film" being preferable for this purpose. Having mounted this film in position and having, in the manner well known in this art, inked the stipples upon their under faces, he makes an impression so as to reproduce upon a piece of paper, or upon some analogous article a facsimile of the stipples. These being all alike, we will say that one of them is represented by 55 in Fig. 6. The operator next raises the printing film frame upon its hinges, this movement being well understood in the art. The operator next moves the needle 52 along one of the straight lines 53 to a predetermined distance measured by so many of the annular graduations 54. In doing this he actuates the pantographic mechanism and leaves the film 46 in a slightly different position from that which it had at the start. He next tightens the screws 48 so as to clamp the rod 33 rigidly in position. Again inking the film upon its under face he lowers the printing film frame 45 and takes a second impression. This time, adjacent to each stipple impression 55, he makes a second stipple impression 56, as will be understood from Fig. 6. Repeating this cycle of operations he produces any number of other stipple impressions 57, 58, so as to produce for each stipple upon the printing film a fragmentary design such as indicated in Fig. 6. Again starting with the same stipple as a basis, the operator, by performing substantially the same cycle of operations, with the exception that he moves the needle 52 around in a curve (following the contour of some one of the annular graduations 54) he produces stipple impressions 59, 60, 61, 62, 63, as indicated in Fig. 7. There will be, therefore, in his entire design, as many composite fragmentary designs of the kind shown in Fig. 7, as the film has stipples, each stipple, of course, moving a complete semicircle, as indicated in Fig. 7.

The operator, in mapping out the various fragmentary designs, must be careful to see that the chain of stipple impressions made from a single stipple (see Figs. 6, 7) is not so long as to overlap the similar fragmentary design made by the next succeeding stipple upon the film. Otherwise the fragmentary designs, indicated, for instance, in Figs. 6 and 7, would overlap each other and cause confusion and blurring.

In Fig. 4, at the point 64, is shown how a crescent may be formed from a film the basis of which is a single stipple. For the sake of clearness other stipples are omitted, but it will be understood that my apparatus can be used with ordinary printing films and that, as a general rule, such films contain a repetition of some simple character, such as a stipple, a wave, a star or the like, and, of course, the finished print will exhibit, for each character of this kind, a composite design made up entirely of such characters and having more or less definiteness independent of the particular character chosen, this definiteness being based upon the general outline followed by the artist in moving the pantographic mechanism.

My invention is used as follows: The parts being assembled as above stated, and the operator wishing to produce a particular design, he simply selects an appropriate film for the purpose, this film, of course, being already mounted in its individual printing film frame. He next mounts the printing film frame upon the hinges and proceeds with the work as above described.

The uses to which the invention may be applied are almost innumerable and may be readily understood by persons having experience in this art. For producing designs to be used for tinting paper for backgrounds of pictures, for producing figures upon wall paper and in a vast variety of other relations, the mechanism above described may be employed with advantage. In some instances the device may be so operated as to produce a design having little or no resemblance to the original or primary character used in its make-up. For instance, if the operator chooses a film having very small stipples spaced widely apart, he can, by making careful measurements and moving the needle 52 by short steps, so take the successive impressions that the stipples overlap each other and merge so as to form a line; and then, by giving this line some arbitrary shape, he can ultimately produce a design having but little, if anything, in it to suggest the shape of the character employed as a basis in its composition.

The set screws 48 may be turned so as to release the bar 33 whenever the printing film frame 45 is to be moved, and in such movement the set screws may be tightened again or left alone, as desired. Where accurate work is to be done, and especially where many distinct impressions of the same kind are to be made from the printing film following each of its movements, the set screws should be tightened after each movement of the film.

As shown in Fig. 8, the bar 33 has plenty of room to move in the brackets 47 whenever permitted to do so by the relaxation of the pressure of the set screws 48. The movements of the printing film frame 45 correspond, as to direction, with movements of the pointer 52, but are much lesser in degree than the movement of said pointer. For instance, movement of the pointer to an extent representing the total diameter of the disk 49 may give the printing film frame a movement no greater than the diameter of one of the stipples to be formed by the printing film.

After each impression made by the printing film 46, the printing film frame 45 is raised upon the hinges 43, or is totally removed from the supporting bar 40 in order to be inked. This is in accordance with the well-known practice of operating printing films and their frames. The hinges 43, 44 serve a good purpose in my apparatus, in that they permit the frame 45 to be swung upwardly or even totally disconnected from its mountings, and yet, in doing this, the movements of the frame for purposes of inking, or the like, do not interfere in any manner with the movements of the printing film frame under guidance of the pointer 52 and disk 49, for the purpose of qualifying the design to be printed.

It will be understood that the mechanism employed may be varied within wide limits without departing from the spirit of my invention. While in this particular instance I show a printing film, I do not limit myself to this particular article, as any other printing medium may be substituted for the film.

In disclosing a pantographic mechanism as my preferred means for actuating the printing medium, I wish to be understood as implying that other appropriate mechanism may be used for this purpose. The needle 52 and scale below it I adopt conveniently as representative of my indicating mechanism, but of course other forms of indicator may sometimes be preferable.

It is essential that the distance between the pins 25, 26 measured along the bar 24 shall be the same as the distance between the pins 31, 32 measured along the bar 19 or the distance between the pins 34, 35 measured along the bar 33, in order that a movement of the printing film frame may be always a faithful and exact reduction of a movement of the needle 52.

While for convenience, I designate the printing film frame as movable, it will be understood that this movement is relative and that it is immaterial whether the work or the printing film frame executes the movements desired, especially that in this art it is sometimes convenient to move the work rather than the printing film frame.

Having thus described my invention, I claim as new and desire to secure by Letters Patent:

1. The combination of a member used as a printing medium, a pantographic frame connected therewith and provided with a plurality of bars disposed parallel with each other, a bar connecting said parallel bars together, bars connected with said parallel bars and connected together by another bar, the distance between the points of such connection being the same as the distance between the said first-mentioned bars, and connections from said printing medium to said first-mentioned bars.

2. The combination of a printing film frame provided with a printing film, a pantographic frame connected with said printing film frame and provided with a plurality of bars disposed parallel with each other, hinge connections from said printing film frame to said pantographic frame, a bar connecting said parallel bars together, bars connected with said parallel bars and connected together by another bar, the distance between the points of said connections being the same as the distance between said first-mentioned bars.

3. The combination of a pantograph, a supporting bar movable thereby, a printing film frame provided with a printing film, and hinges mounted upon said supporting bar and connected with said printing film frame to permit the latter to swing independently of any movement said printing film frame may receive from said pantograph.

4. The combination of a pantograph, a bar connected therewith, means controllable at will for clamping said bar in various positions which said bar may assume, a supporting bar, connections from said supporting bar to said first-mentioned bar, hinges mounted upon said supporting bar, a printing film frame mounted upon said hinges and adapted to swing independently of any motion given to said supporting bar by said pantograph.

5. The combination of a supporting bar, a printing film frame detachably connected therewith and movable relatively thereto for the purpose of causing said printing film frame to approach and recede from the work, and mechanism connected with said supporting bar and controllable at will for shifting the general position of said supporting bar in any desired direction chosen arbitrarily within a predetermined plane.

6. The combination of a supporting bar, a printing film frame connected therewith and movable relatively thereto for the purpose of approaching and receding from the work, a pantograph, and connections from said pantograph to said supporting bar for the purpose of moving the same arbitrarily in any desired direction within a given plane.

7. The combination of a supporting member, a printing film frame pivotally mounted thereupon and provided with a printing film, said printing film frame being adapted to approach and recede from the work to be done, a pantograph, connections from the same to said supporting member for the purpose of moving said supporting member and said printing film frame in any direction chosen arbitrarily within a predetermined plane, and means controllable at will for determining movements of said pantograph.

8. The combination of a pantograph, a bar connected therewith, brackets disposed adjacent to said bar, set screws engaging said brackets and adapted to be brought into engagement with said bar for the purpose of temporarily holding the same in predetermined positions, a pantograph for shifting the position of said bar while maintaining the same parallel with its original position, a printing film frame, and connections from said bar to said printing film frame.

9. The combination of a pantograph, a printing film frame, connections from said printing film frame to said pantograph, said printing film frame being movable relatively to said pantograph for the purpose of approaching and receding from the work, and mechanism for enabling the operator to accurately guide movements of said pantograph.

10. The combination of a printing film frame, a pantograph, connections from said printing film frame to said pantograph, a pointer connected with said pantograph, and a disk disposed adjacent to said pointer and normally stationary in relation to said pantograph for the purpose of enabling the operator to control with accuracy the movements of said pantograph.

11. The combination of a printing film frame, a pantograph, connections from said printing film frame to said pantograph, a pointer connected with said pantograph, a disk disposed adjacent to said pointer and normally stationary in relation to said pantograph for the purpose of enabling the operator to control with accuracy the movement of said pantograph, and means for adjusting said disk in order to guide the operator
5 in controlling said movement of said pantograph.

In testimony whereof I have signed my name to this specification in the presence of two subscribing witnesses.

HENRI L. FALCO.

Witnesses:
 ARTHUR W. PEACE,
 GEORGE A. MAC DONNALD.